(12) United States Patent
Tsuboi

(10) Patent No.: US 7,540,463 B2
(45) Date of Patent: Jun. 2, 2009

(54) PROJECTOR STAND

(75) Inventor: Tomoaki Tsuboi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 322 days.

(21) Appl. No.: 11/474,360

(22) Filed: Jun. 26, 2006

(65) Prior Publication Data

US 2006/0289715 A1    Dec. 28, 2006

(30) Foreign Application Priority Data

Jun. 27, 2005    (JP) ............................. 2005-186621

(51) Int. Cl.
*F16M 13/00*    (2006.01)
(52) U.S. Cl. ..................................... 248/393; 248/920
(58) Field of Classification Search ................. 248/371, 248/372.1, 393, 394, 395, 396, 397, 398, 248/920, 923
See application file for complete search history.

(56) References Cited

U.S. PATENT DOCUMENTS

| | | | | |
|---|---|---|---|---|
| 5,588,625 A | * | 12/1996 | Beak | ........................... 248/371 |
| 5,632,463 A | * | 5/1997 | Sung et al. | ................... 248/371 |
| 5,687,944 A | * | 11/1997 | Shon | ........................ 248/349.1 |
| 6,024,336 A | * | 2/2000 | Lin et al. | ..................... 248/371 |
| 6,089,520 A | * | 7/2000 | Wu et al. | ..................... 248/371 |
| 6,116,560 A | * | 9/2000 | Kim | ............................ 248/371 |

FOREIGN PATENT DOCUMENTS

JP    2002-209161 A    7/2002

\* cited by examiner

*Primary Examiner*—Ramon O Ramirez
(74) *Attorney, Agent, or Firm*—Crowell & Moring LLP

(57) ABSTRACT

A projector stand capable of regulating inclinations of a projector with respect to a horizontal plane in a projective direction and a direction perpendicular to the projective direction within a prescribed angular range is obtained. This projector stand includes a stand member including a first angle regulating portion for regulating the inclinations of the projector with respect to the horizontal plane in the projective direction and the direction perpendicular to the projective direction within the prescribed angular range and a support member including a second angle regulating portion for regulating the inclinations of the projector within the prescribed angular range by engaging with the first angle regulating portion of the stand member and coming into contact with a prescribed portion of the first angle regulating portion.

20 Claims, 10 Drawing Sheets

35   34 36 31   33   3   35

41   4

PROJECTOR STAND

BACKGROUND OF THE INVENTION

1. Field of the Invention

The present invention relates to a projector stand, and more particularly, it relates to a projector stand comprising a support member for supporting a projector.

2. Description of the Background Art

A projector support mechanism (stand) capable of supporting a projector while allowing angle adjustment is known in general, as disclosed in Japanese Patent Laying-Open No. 2002-209161, for example.

The aforementioned Japanese Patent Laying-Open No. 2002-209161 discloses a projector support mechanism (stand) comprising a stand member, a support member movably arranged with respect to the stand member for supporting a projector and a fixing member for pressing the support member against the stand member, for allowing angle adjustment of the projector with respect to a horizontal plane in a projective direction (optical axis direction) and a direction perpendicular to the projective direction (optical axis direction) by moving the support member around a vertical axis and an axis perpendicular to the optical axis.

In the conventional projector stand disclosed in the aforementioned Japanese Patent Laying-Open No. 2002-209161, however, it is difficult to regulate inclinations of the projector with respect to the horizontal plane in the projective direction (optical axis direction) and the direction perpendicular to the projective direction (optical axis direction) within a prescribed angular range in angle adjustment of the projector. Consequently, the inclinations of the projector may disadvantageously be superfluously varied in angle adjustment of the projector in the projector stand according to the aforementioned Japanese Patent Laying-Open No. 2002-209161.

SUMMARY OF THE INVENTION

The present invention has been proposed in order to solve the aforementioned problem, and an object of the present invention is to provide a projector stand capable of regulating inclinations of a projector with respect to a horizontal plane in a projective direction and a direction perpendicular to the projective direction within a prescribed angular range.

In order to attain the aforementioned object, a projector stand according to a first aspect of the present invention comprises a stand member including a recess portion and a first angle regulating portion integrally provided in the recess portion for regulating inclinations of a projector with respect to a horizontal plane in a projective direction and a direction perpendicular to the projective direction within a prescribed angular range and a support member integrally provided with a second angle regulating portion for regulating the inclinations of the projector within the prescribed angular range by engaging with the first angle regulating portion of the stand member and coming into contact with a prescribed portion of the first angle regulating portion and movably arranged in a state supported in the recess portion of the stand member for supporting the projector to be inclinable at prescribed angles with respect to the horizontal plane in at least the projective direction and the direction perpendicular to the projective direction.

As hereinabove described, the projector stand according to the first aspect of the present invention comprises the stand member including the first angle regulating portion for regulating the inclinations of the projector with respect to the horizontal plane in the projective direction and the direction perpendicular to the projective direction and the support member including the second angle regulating portion for regulating the inclinations of the projector within the prescribed angular range by engaging with the first angle regulating portion of the stand member and coming into contact with the prescribed portion of the first angle regulating portion so that the second angle regulating portion of the support member engages with the first angle regulating portion of the stand member and comes into contact with the prescribed portion of the first angle regulating portion when the support member moves with respect to the stand member, whereby the inclinations of the projector can be regulated within the prescribed angular range. Thus, the inclinations of the projector, regulable within the prescribed angular range, are not superfluously varied. Consequently, the user of the projector stand can easily adjust the projector to a desired angle of projection.

The aforementioned projector stand according to the first aspect preferably further comprises a fixing member for movably mounting the support member on the stand member. According to this structure, dismount of the support member from the stand member can be easily suppressed through the fixing member.

In this case, the stand member preferably includes a hook, and the fixing member preferably includes an engaging hole engaging with the hook of the stand member. According to this structure, the support member can be easily mounted on the stand member by engaging the hook with the engaging hole.

In the aforementioned projector stand according to the first aspect, the first angle regulating portion of the stand member preferably includes an angle regulating groove rectangular in plan view, and the second angle regulating portion of the support member preferably includes an angle regulating protrusion inserted into the angle regulating groove of the stand member for regulating the inclinations of the projector within the prescribed angular range by coming into contact with the inner surface of the angle regulating groove. According to this structure, the support member is movable with respect to the stand member until the angle regulating protrusion comes into contact with the angle regulating groove. Thus, the movable range of the support member with respect to the stand member in the projective direction and the direction perpendicular to the projective direction can be set by setting the lengths of the angle regulating protrusion and the angle regulating groove in the longitudinal direction and the short-side direction respectively.

In this case, the angle regulating groove of the stand member preferably includes a first angle regulating groove and a second angle regulating groove, the angle regulating protrusion of the support member preferably includes a first angle regulating protrusion and a second angle regulating protrusion corresponding to the first angle regulating groove and the second angle regulating groove respectively, and the length of the first angle regulating protrusion along the short-side direction in plan view is preferably rendered smaller than the length of the first angle regulating groove along the short-side direction in plan view and larger than the length of the second angle regulating groove along the short-side direction in plan view. According to this structure, the first angle regulating protrusion is receivable in the first angle regulating groove and unreceivable in the second angle regulating groove. Thus, the first angle regulating protrusion unreceivable in the second angle regulating groove is inserted into the first angle regulating groove when the support member is mounted on the stand member. Consequently, the direction for mounting the support member on the stand member is so uniquely set that the user can be prevented from mounting the support member in a false direction. When the support member is mounted on the stand member, therefore, a screw receiving hole of the stand member is necessarily arranged on a position corresponding to a screw mounting hole of the support member, whereby the projector stand can be prevented from impossibility of mounting the projector on the support member mounted with the stand member.

In the aforementioned projector stand according to the first aspect, the stand member preferably includes an either concave or convex first locating portion for horizontally locating the projector, and the support member preferably includes an either convex or concave second locating portion for horizontally locating the projector by engaging with the first locating portion of the stand member. According to this structure, the projector can be easily horizontally located by simply engaging the second locating portion of the support member with the first locating portion of the stand member. Further, the support member can be horizontally arranged with respect to the stand member by engaging the second locating portion of the support member with the first locating portion of the stand member, whereby a plurality of screw mounting holes of the support member and a plurality of screw receiving holes of the stand member can be arranged on positions corresponding to each other when the projector is mounted on the support member. Thus, the projector can be easily mounted on the support member.

In the aforementioned projector stand according to the first aspect, the stand member preferably includes a plurality of screw receiving holes provided at a prescribed angular interval with a prescribed radial distance from the center of the recess portion and a marker integrally provided on the center of the recess portion for specifying the directions for providing the plurality of screw receiving holes, and the support member preferably includes a plurality of screw mounting holes arranged in correspondence to the plurality of screw receiving holes of the stand member respectively. According to this structure, the plurality of screw receiving holes and the plurality of screw mounting holes can be arranged on positions corresponding to each other when the support member is mounted on the stand member by arranging the plurality of screw mounting holes in the direction specified through the marker. Thus, the user can be prevented from arranging the support member on the stand member in a false direction. Consequently, the projector stand can be prevented from impossibility of mounting the projector on the support member mounted with the stand member.

In the aforementioned projector stand according to the first aspect, the recess portion of the stand member is preferably spherically shaped, and the support member preferably includes a lower surface having the same radius of curvature as the recess portion of the stand member. According to this structure, the support member can be smoothly moved with respect to the stand member by sliding the spherical lower surface of the support member with respect to the spherical recess portion of the stand member.

In the aforementioned projector stand according to the first aspect, a reinforcing rib for increasing the mechanical strength of the stand member is preferably provided on a surface of the stand member opposite to the surface formed with the recess portion. According to this structure, the weight of the stand member as well as the quantity of the material for the stand member can be reduced while maintaining the mechanical strength of the stand member with the reinforcing rib.

In the aforementioned projector stand according to the first aspect, a reinforcing rib for increasing the mechanical strength of the support member is preferably provided on the upper surface of the support member. According to this structure, the weight of the support member as well as the quantity of the material for the support member can be reduced while maintaining the mechanical strength of the support member with the reinforcing rib.

In the aforementioned projector stand according to the first aspect, the stand member is preferably made of resin. According to this structure, the recess portion and the first angle regulating portion can be easily integrally formed by resin molding, whereby the number of components can be inhibited from increase.

In the aforementioned projector stand according to the first aspect, the support member is preferably made of resin. According to this structure, the second angle regulating portion can be easily integrally formed by resin molding, whereby the number of components can be inhibited from increase.

A projector stand according to a second aspect of the present invention comprises a stand member having a recess portion and a support member movably arranged in a state supported in the recess portion of the stand member for supporting a projector to be inclinable at prescribed angles with respect to a horizontal plane in at least a projective direction and a direction perpendicular to the projective direction, while the stand member includes a first angle regulating portion integrally provided in the recess portion for regulating inclinations of the projector with respect to the horizontal plane in the projective direction and the direction perpendicular to the projective direction within a prescribed angular range, an either concave or convex first locating portion for horizontally locating the projector, a plurality of screw receiving holes provided at a prescribed angular interval with a prescribed radial distance from the center of the recess portion and a marker integrally provided on the center of the recess portion for specifying the directions for providing the plurality of screw receiving holes, the support member is integrally provided with a second angle regulating portion for regulating the inclinations of the projector within the prescribed angular range by engaging with the first angle regulating portion of the stand member and coming into contact with a prescribed portion of the first angle regulating portion, and the support member includes an either convex or concave second locating portion for horizontally locating the projector by engaging with the first locating portion of the stand member and a plurality of screw mounting holes arranged in correspondence to the plurality of screw receiving holes of the stand member respectively, the first angle regulating portion of the stand member includes an angle regulating groove rectangular in plan view, and the second angle regulating portion of the support member includes an angle regulating protrusion entering the angle regulating groove of the stand member.

As hereinabove described, the projector stand according to the second aspect of the present invention comprises the stand member including the first angle regulating portion for regulating the inclinations of the projector with respect to the horizontal plane in the projective direction and the direction perpendicular to the projective direction and the support member including the second angle regulating portion for regulating the inclinations of the projector within the prescribed angular range by engaging with the first angle regulating portion of the stand member and coming into contact with the prescribed portion of the first angle regulating portion so that the second angle regulating portion of the support member engages with the first angle regulating portion of the stand member and comes into contact with the prescribed portion of the first angle regulating portion when the support member moves with respect to the stand member, whereby the inclinations of the projector can be regulated in the prescribed angular range. Thus, the inclinations of the projector, regulable within the prescribed angular range, are not superfluously varied. Consequently, the user of the projector stand can easily adjust the projector to a desired angle of projection. Further, the first angle regulating portion of the stand member includes an angle regulating groove rectangular in plan view and the second angle regulating portion of the support member includes an angle regulating protrusion regulating the inclinations of the projector within the prescribed angular range by entering the angle regulating groove of the stand member and coming into contact with the inner surface of the angle regulating groove, whereby the support member is movable with respect to the stand member until the angle regulating protrusion comes into contact with the angle regulating groove. Thus, the movable range of the support member with respect to the stand member in the projective direction and the direction perpendicular to the projective direction can be set by setting the lengths of the angle regulating protrusion and the angle regulating groove in the longitudinal direction and the short-side direction respectively. In addition, the stand member includes the concave or convex first locating portion for horizontally locating the projector and the support member includes the convex or concave second locating portion for horizontally locating the projector by engaging with the first locating portion of the stand member, whereby the projector can be easily horizontally located by simply engaging the second locating portion of the support member with the first locating portion of the stand member.

According to the second aspect, further, the support member can be horizontally arranged with respect to the stand member by engaging the second locating portion of the support member with the first locating portion of the stand member, whereby the plurality of screw mounting holes of the support member and the plurality of screw receiving holes of the stand member can be arranged on positions corresponding to each other when the projector is mounted on the support member. Thus, the projector can be easily mounted on the support member. In addition, the stand member includes the plurality of screw receiving holes provided at the prescribed angular interval with the prescribed radial distance from the center of the recess portion and the marker integrally provided on the center of the recess portion for specifying the directions for providing the plurality of screw receiving holes while the support member includes the plurality of screw mounting holes arranged in correspondence to the plurality of screw receiving holes of the stand member respectively, whereby the plurality of screw receiving holes and the plurality of screw mounting holes can be arranged on the positions corresponding to each other when the support member is mounted on the stand member by arranging the plurality of screw mounting holes in the direction specified through the marker. Thus, the user can be prevented from arranging the support member on the stand member in a false direction. Consequently, the projector stand can be prevented from impossibility of mounting the projector on the support member mounted with the stand member.

The aforementioned projector stand according to the second aspect preferably further comprises a fixing member for movably mounting the support member on the stand member. According to this structure, dismount of the support member from the stand member can be easily suppressed through the fixing member.

In this case, the stand member preferably includes a hook, and the fixing member preferably includes an engaging hole engaging with the hook of the stand member. According to this structure, the support member can be easily mounted on the stand member by engaging the hook with the engaging hole.

In the aforementioned projector stand according to the second aspect, the recess portion of the stand member is preferably spherically shaped, and the support member preferably includes a lower surface having the same radius of curvature as the recess portion of the stand member. According to this structure, the support member can be smoothly moved with respect to the stand member by sliding the spherical lower surface of the support member with respect to the spherical recess portion of the stand member.

In the aforementioned projector stand according to the second aspect, a reinforcing rib for increasing the mechanical strength of the stand member is preferably provided on a surface of the stand member opposite to the surface formed with the recess portion. According to this structure, the weight of the stand member as well as the quantity of the material for the stand member can be reduced while maintaining the mechanical strength of the stand member with the reinforcing rib.

In the aforementioned projector stand according to the second aspect, a reinforcing rib for increasing the mechanical strength of the support member is preferably provided on the upper surface of the support member. According to this structure, the weight of the support member as well as the quantity of the material for the support member can be reduced while maintaining the mechanical strength of the support member with the reinforcing rib.

In the aforementioned projector stand according to the second aspect, the stand member is preferably made of resin. According to this structure, the recess portion and the first angle regulating portion can be easily integrally formed by resin molding, whereby the number of components can be inhibited from increase.

In the aforementioned projector stand according to the second aspect, the support member is preferably made of resin. According to this structure, the second angle regulating portion can be easily integrally formed by resin molding, whereby the number of components can be inhibited from increase.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

Figure 1:
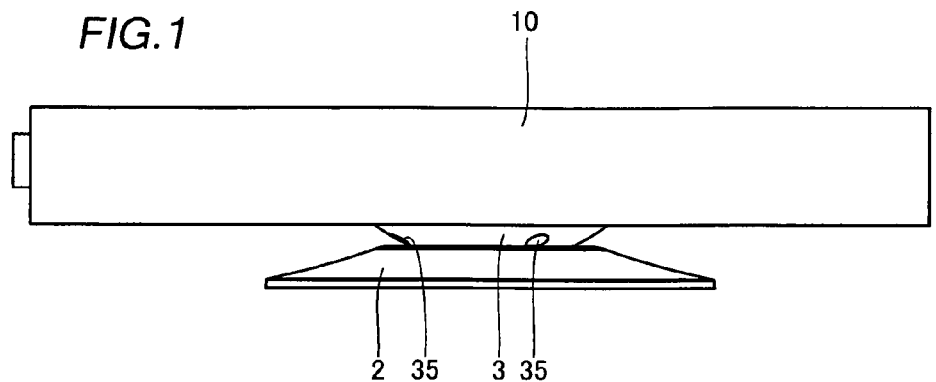
FIG. 1 is a side elevational view showing a projector stand according to a first embodiment of the present invention in a state mounted with a projector.
Figure 2:
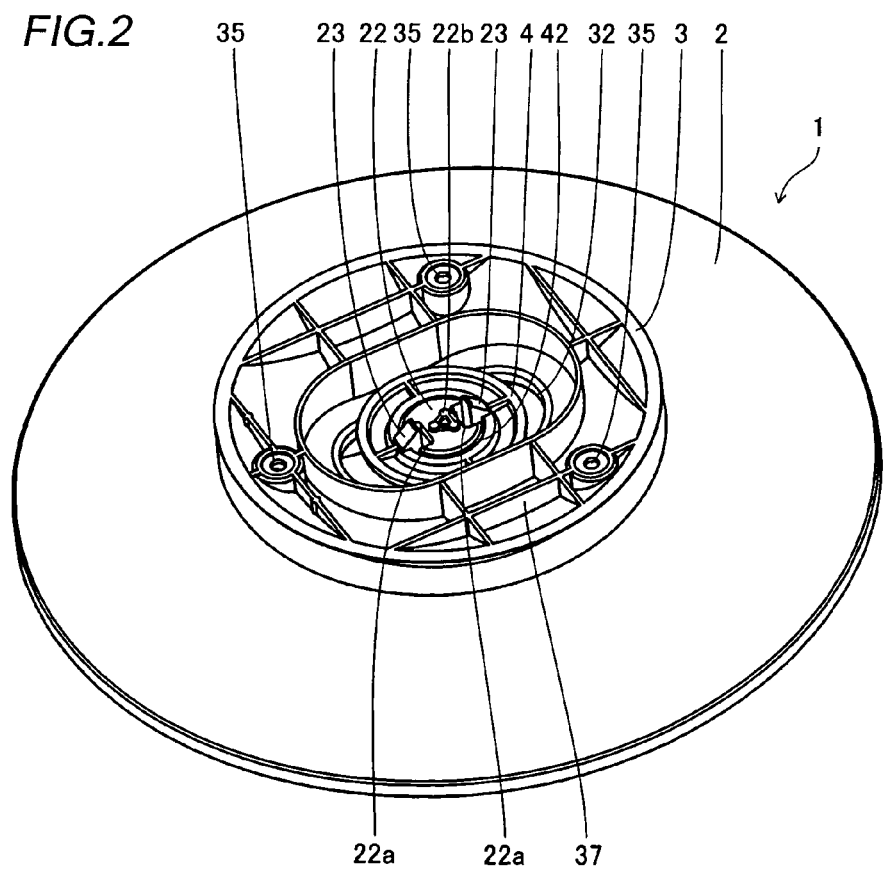
FIG. 2 is a perspective view showing the structure of the projector stand according to the first embodiment of the present invention.
Figure 3:
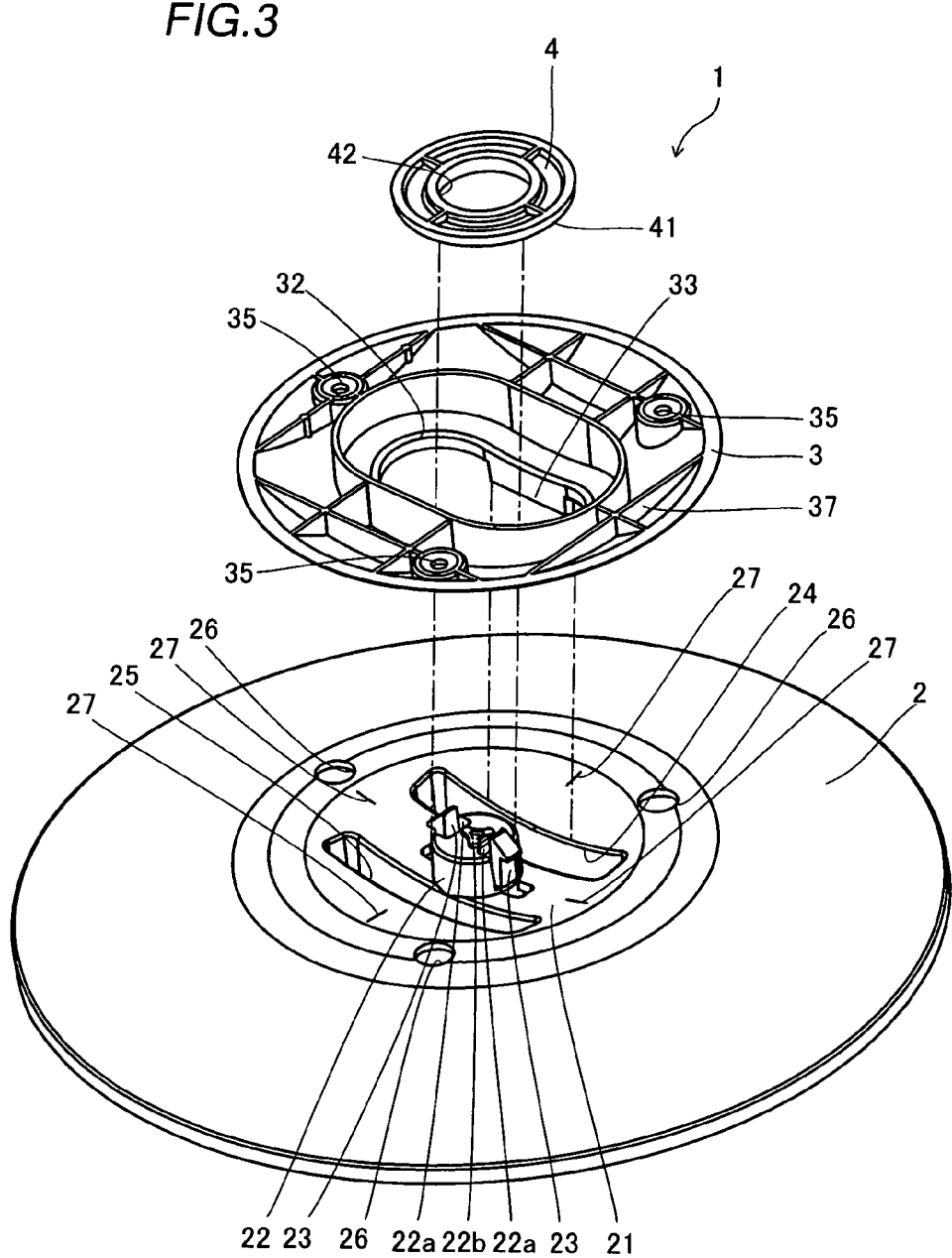
FIG. 3 is an exploded perspective view of the projector stand according to the first embodiment shown in FIG. 2.

FIG. 1 is a side elevational view showing a projector stand 1 according to a first embodiment of the present invention in a state mounted with a projector 10. FIG. 2 is a perspective view showing the structure of the projector stand 1 according to the first embodiment of the present invention. FIG. 3 is an exploded perspective view of the projector stand 1 according to the first embodiment shown in FIG. 2. FIGS. 4 to 9 are diagrams for illustrating the details of the structure of the projector stand 1 according to the first embodiment shown in FIG. 2. The structure of the projector stand 1 according to the first embodiment is described with reference to FIGS. 1 to 9.

As shown in FIG. 1, the projector stand 1 according to the first embodiment is enabled to support the projector 10. This projector stand 1 is constituted of a stand member 2, a support member 3 and a fixing member 4, as shown in FIGS. 2 and 3. The stand member 2, the support member 3 and the fixing member 4 are made of resin such as ABS resin.

Figure 4:
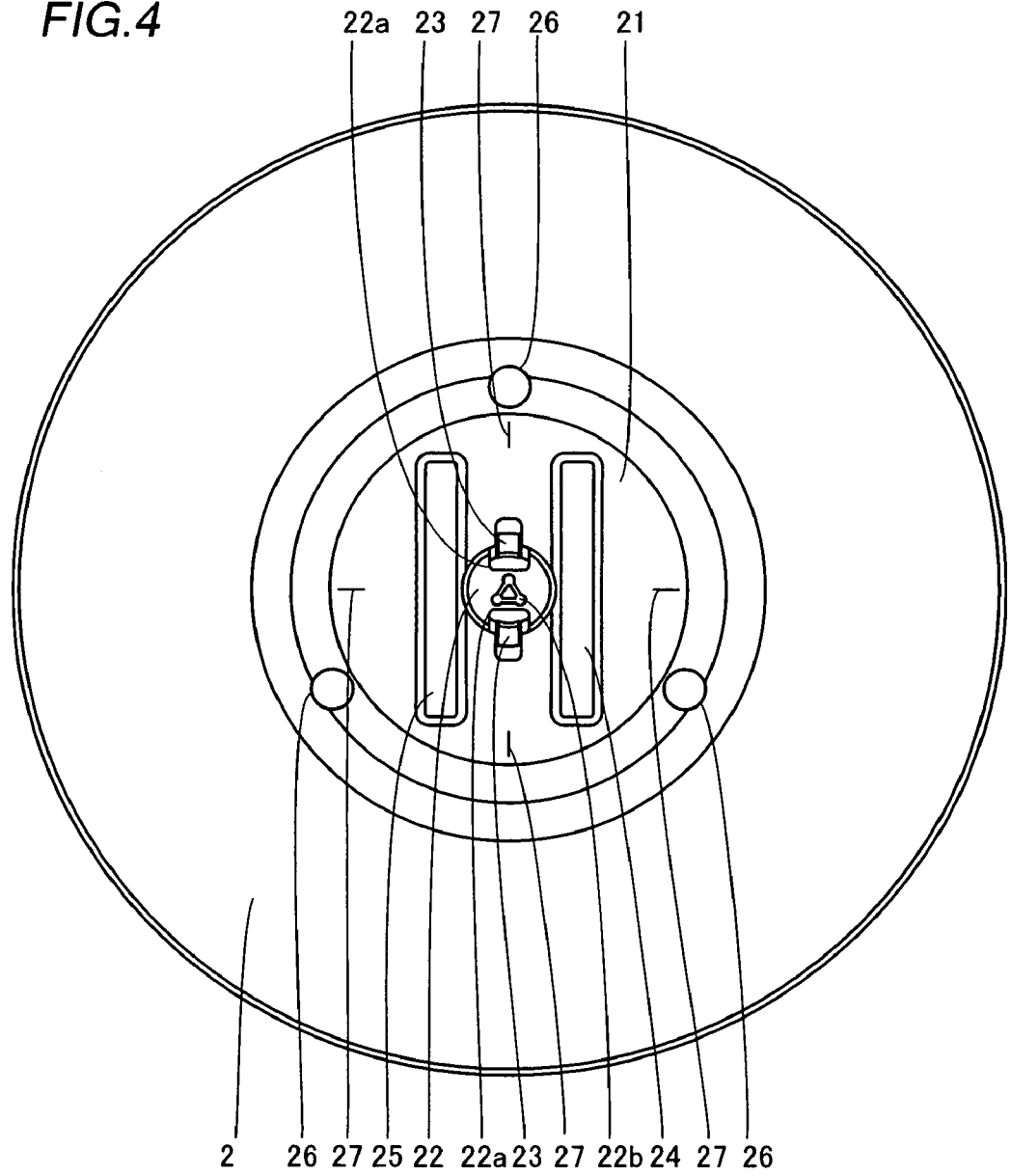
FIG. 4 is a plan view of a stand member of the projector stand according to the first embodiment shown in FIG. 2.
Figure 5:
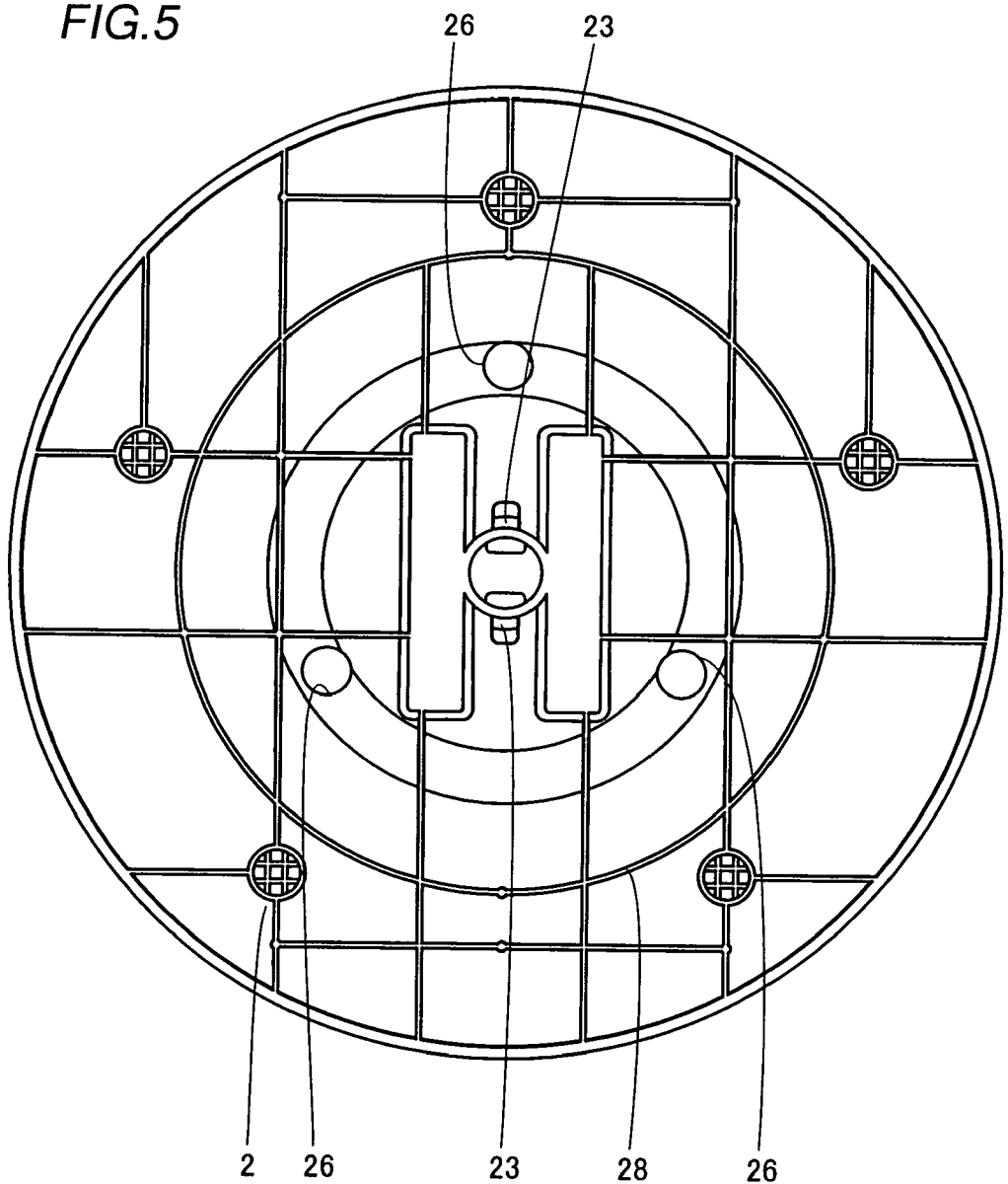
FIG. 5 is a rear elevational view of the stand member of the projector stand according to the first embodiment shown in FIG. 2.
Figure 6:
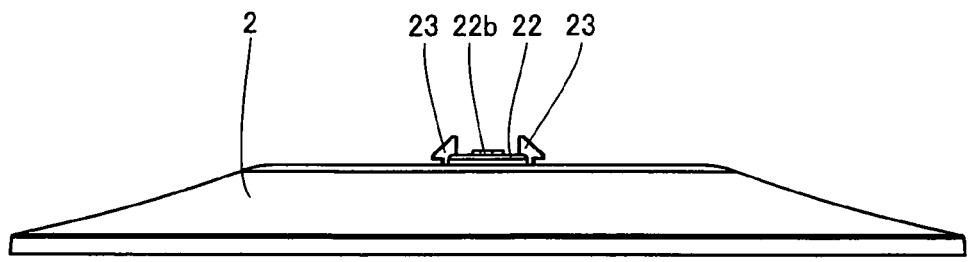
FIG. 6 is a side elevational view of the stand member of the projector stand according to the first embodiment shown in FIG. 2.

According to the first embodiment, the stand member 2 includes a recess portion 21, a cylindrical portion 22, a pair of hooks 23, angle regulating grooves 24 and 25 and three screw receiving holes 26, as shown in FIGS. 3 and 4. The angle regulating grooves 24 and 25 are examples of the "first angle regulating portion" in the present invention. The recess portion 21, arranged on the center of the stand member 2, is spherically shaped. Four convex first locating portions 27 having a small height are formed on the surface of the recess portion 21 at prescribed intervals from each other. The cylindrical portion 22 is integrally formed on the surface of the recess portion 21, while a pair of notches 22a are provided on the side surface of the cylindrical portion 22, to be opposed to each other through the cylindrical portion 22. A marker 22b specifying the directions for providing the three screw receiving holes 26 respectively is formed on the upper surface of the cylindrical portion 22. The pair of hooks 23 are integrally provided on portions corresponding to the pair of notches 22a of the cylindrical portion 22 respectively. The pair of hooks 23 protrude upward from the upper end of the stand member 22, as shown in FIG. 6. The angle regulating grooves 24 and 25, substantially rectangular in plan view, are formed parallelly to each other through the cylindrical portion 22. The three screw receiving holes 26 are arranged at intervals of 120° with a prescribed radial distance from the center of the recess portion 21. As shown in FIG. 5, reinforcing ribs 28 are provided on the back surface of the stand member 2, in order to increase the mechanical strength of the overall stand member 2.

Figure 7:
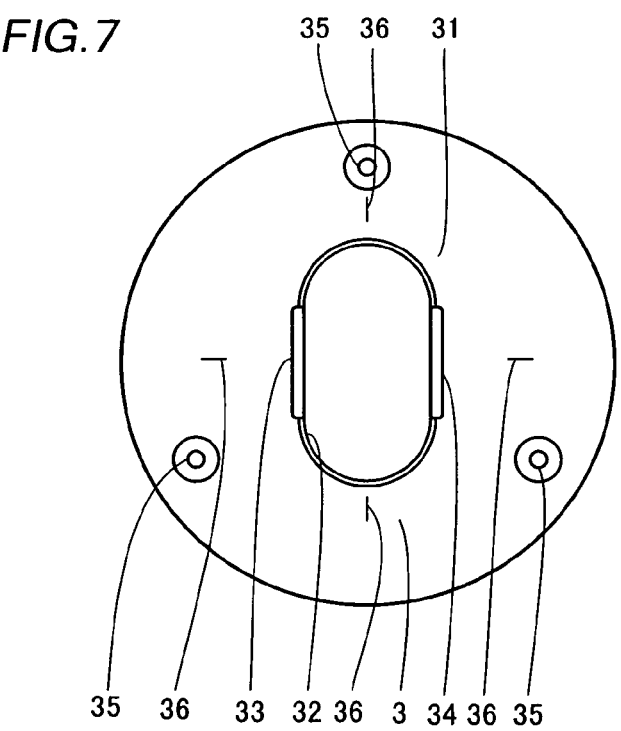
FIG. 7 is a plan view of a support member of the projector stand according to the first embodiment shown in FIG. 2.
Figure 8:
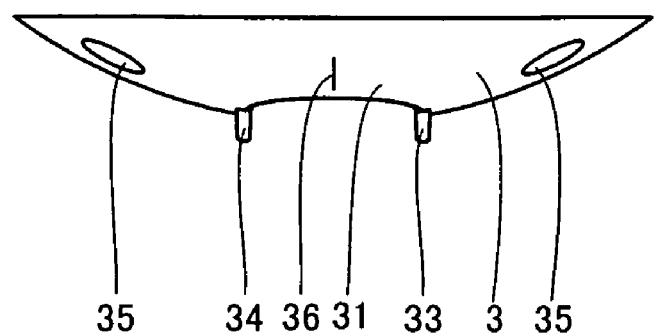
FIG. 8 is a side elevational view of the support member of the projector stand according to the first embodiment shown in FIG. 2.

According to the first embodiment, the support member 3 is provided for supporting the projector 10. Further, the support member 3 is movably arranged on the recess portion 21 of the stand member 2. More specifically, the support member 3 has a downwardly convexed spherical lower surface 31, as shown in FIGS. 7 and 8. The spherical lower surface 31 of the support member 3 has the same radius of curvature as the recess portion 21 of the stand member 2. This spherical lower surface 31 of the support member 3 is fitted into the recess portion 21 of the stand member 2.

The support member 3 includes a long hole 32, riblike angle regulating protrusions 33 and 34 and three screw mounting holes 35. The angle regulating protrusions 33 and 34 are examples of the "second angle regulating portion" in the present invention. The long hole 32 is formed in a region corresponding to the recess portion 21 of the stand member 2. When the support member 3 is arranged on the stand member 2, the pair of hooks 23 of the stand member upwardly protrude through the long hole 32. The angle regulating protrusions 33 and 34 are integrally arranged on both ends of the long hole 32 along the short-side direction respectively, to protrude toward the stand member 2. When the support member 3 is arranged on the stand member 2, the angle regulating protrusions 33 and 34 are received in the angle regulating grooves 24 and 25 of the stand member 2 respectively.

According to the first embodiment, first longitudinal side surfaces of the angle regulating protrusions 33 and 34 of the support member 3 come into contact with first longitudinal inner side surfaces of the angle regulating grooves 24 and 25 of the stand member 2 respectively when the support member 3 is so moved as to upwardly change the inclination in a projective direction. Therefore, the angle regulating protrusions 33 and 34 and the angle regulating grooves 24 and 25 are so provided that the support member 3 is movable with respect to the stand member 2 up to a prescribed inclination (10°) with respect to a horizontal plane in the projective direction. When the support member 3 is so moved as to downwardly change the inclination in the projective direction, on the other hand, second longitudinal side surfaces of the angle regulating protrusions 33 and 34 of the support member 3 come into contact with second longitudinal inner side surfaces of the angle regulating grooves 24 and 25 of the stand member 2. Therefore, the angle regulating protrusions 33 and 34 and the angle regulating grooves 24 and 25 are so provided that the support member 3 is movable with respect to the stand member 2 up to another prescribed inclination (−10°) with respect to the horizontal plane in the projective direction. When the support member 3 is so moved as to upwardly change the inclination in a direction perpendicular to the projective direction, further, the outer side surface of the angle regulating protrusion 33 of the support member 3 along the short-side direction comes into contact with the outer side surface of the angle regulating groove 24 of the stand member 2 along the short-side direction. Therefore, the angle regulating protrusion 33 and the angle regulating groove 24 are so provided that the support member 3 is movable with respect to the stand member 2 up to a prescribed inclination (1.5°) with respect to the horizontal plane in the direction perpendicular to the projective direction. When the support member 3 is so moved as to downwardly change the inclination in the direction perpendicular to the projective direction, in addition, the outer side surface of the angle regulating protrusion 34 of the support member 3 along the short-side direction comes into contact with the outer side surface of the angle regulating groove 25 of the stand member 2 along the short-side direction. Therefore, the angle regulating protrusion 34 and the angle regulating groove 25 are so provided that the support member 3 is movable with respect to the stand member 2 up to another prescribed inclination (−1.5°) with respect to the horizontal plane in the direction perpendicular to the projective direction.

The lower surface 31 of the support member 3 is formed with four concave second locating portions 36. The four second locating portions 36 of the support member 3 are arranged on regions corresponding to the four first locating portions 27 of the stand member 2 respectively. The three screw mounting holes 35 are formed in positions corresponding to the three screw receiving holes 26 of the stand member 2 respectively. A reinforcing rib 37 is provided on the upper surface of the support member 3 for increasing the mechanical strength of the overall support member 3, as shown in FIG. 3.

Figure 9:
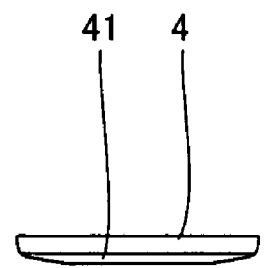
FIG. 9 is a side elevational view of a fixing member of the projector stand according to the first embodiment shown in FIG. 2.

According to the first embodiment, the fixing member 4 includes a lower surface 41 and an engaging hole 42, as shown in FIGS. 3 and 9. The lower surface 41 is spherically shaped. The engaging hole 42 is provided for movably mounting the support member 3 on the stand member 2 by engaging with the pair of hook portions 23 of the stand member 2.

A method of assembling the projector stand 1 according to the first embodiment is now described with reference to FIG. 3. First, the support member 3 is so arranged on the stand member 2 as to arrange the three screw mounting holes 35 of the support member 3 in the apical directions of the marker 22b extending from the center thereof respectively. Thus, the three screw mounting holes 35 of the support member 3 are arranged on the three screw receiving holes 26 of the stand member 2 respectively. Further, the hooks 23 of the stand member 2 upwardly protrude through the long hole 32 of the support member 3.

Thereafter the engaging hole 42 of the fixing member 4 is engaged with the hooks 23 of the stand member 2, thereby assembling the projector stand 1. The support member 3 can be easily horizontally moved with respect to the stand member 2 by engaging the four second locating portions 36 of the support member 3 with the four first locating portions 27 of the stand member 2. Thus, the user of the projector stand 1 can easily adjust the projector 10 to a desired angle of projection by horizontally moving the support member 3, and easily arrange the three screw mounting holes 35 of the support member 3 and the three screw receiving holes 26 of the stand member 2 on positions corresponding to each other when mounting the projector 10 on the support member 3.

Figure 10:
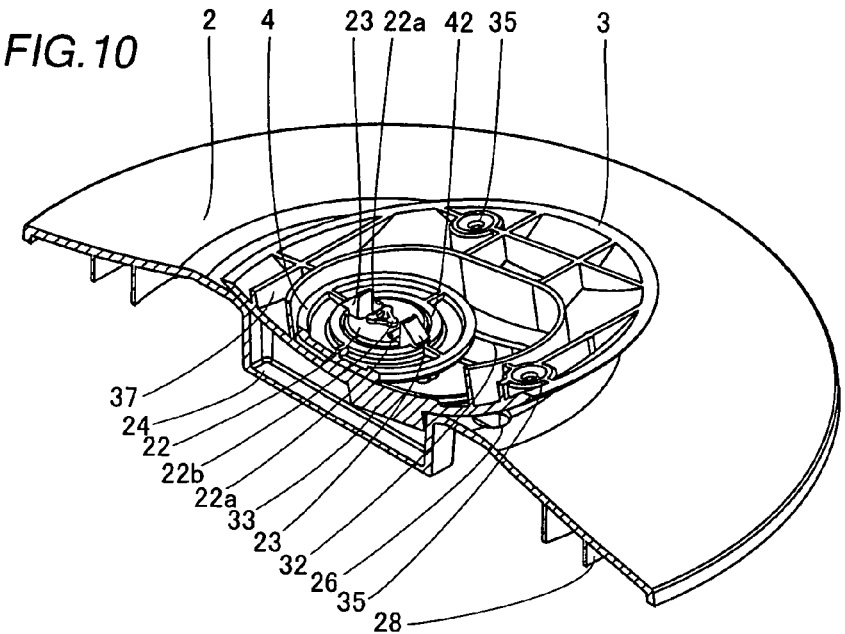
FIG. 10 is a sectional view showing the projector stand according to the first embodiment of the present invention at an upwardly changed inclination in a projective direction.
Figure 11:
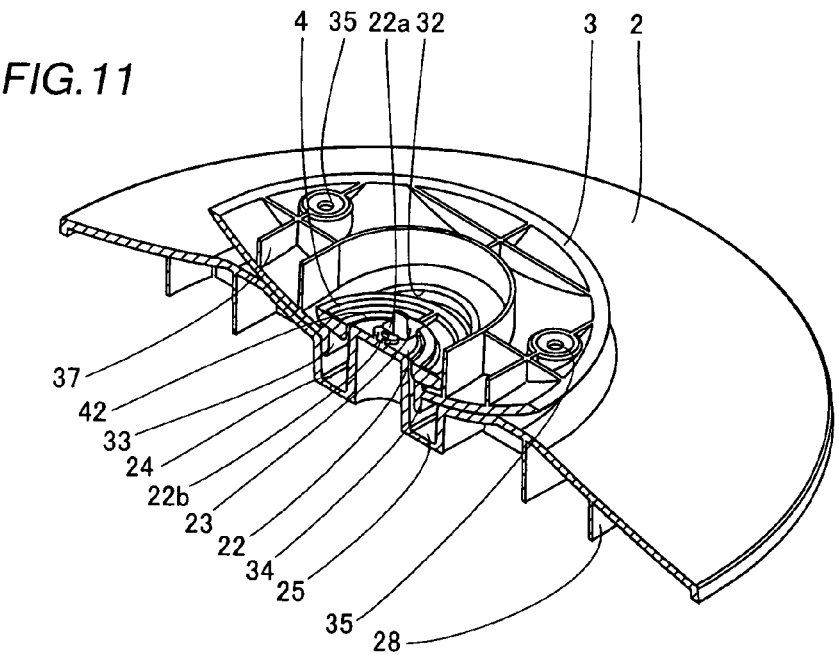
FIG. 11 is a sectional view showing the projector stand according to the first embodiment of the present invention at an upwardly changed inclination in a direction perpendicular to the projective direction.

FIG. 10 is a sectional view showing the projector stand 1 according to the first embodiment of the present invention at an upwardly changed inclination in the projective direction. FIG. 11 is a sectional view showing the projector stand 1 according to the first embodiment of the present invention at an upwardly changed inclination in the direction perpendicular to the projective direction. An operation of changing the inclinations of the projector stand 1 according to the first embodiment is now described with reference to FIGS. 2, 10 and 11.

In order to upwardly change the inclination of the projector 10 in the projective direction, the protrusions 33 and 34 of the support member 3 are moved forward, as shown in FIG. 10. At this time, the support member 3 is movable until the first longitudinal side surfaces of the angle regulating protrusions 33 and 34 of the support member 3 come into contact with the first longitudinal inner side surfaces of the angle regulating grooves 24 and 25 of the stand member 2 respectively. Thus, the support member 3 is movable up to the prescribed inclination (10°) with respect to the horizontal plane in the projective direction. In order to downwardly change the inclination of the projector 10 in the projective direction, on the other hand, the protrusions 33 and 34 of the support member 3 are moved backward. At this time, the support member 3 is movable until the second longitudinal side surfaces of the angle regulating protrusions 33 and 34 of the support member 3 come into contact with the second longitudinal inner side surfaces of the angle regulating grooves 24 and 25 of the stand member 2 respectively. Thus, the support member 3 is movable up to the prescribed inclination (−10°) with respect to the horizontal plane in the projective direction.

In order to upwardly change the inclination of the projector 10 in the direction perpendicular to the projective direction, the protrusions 33 and 34 of the support member 3 are moved rightward, as shown in FIG. 11. At this time, the support member 3 is movable until the outer side surface of the angle regulating protrusion 33 of the support member 3 along the short-side direction comes into contact with the outer side surface of the angle regulating groove 24 of the stand member 2 along the short-side direction. Thus, the support member 3 is movable up to the prescribed inclination (1.5°) with respect to the horizontal plane in the direction perpendicular to the projective direction. In order to downwardly change the inclination of the projector 10 in the direction perpendicular to the projective direction, on the other hand, the protrusions 33 and 34 of the support member 3 are moved leftward. At this time, the support member 3 is movable until the outer side surface of the angle regulating protrusion 34 of the support member 3 along the short-side direction comes into contact with the outer side surface of the angle regulating groove 25 of the stand member 2 along the short-side direction. Thus, the support member 3 is movable up to the prescribed inclination (−1.5°) with respect to the horizontal plane in the direction perpendicular to the projective direction.

According to the first embodiment, as hereinabove described, the projector stand 1 comprises the stand member 2 including the angle regulating grooves 24 and 25 for regulating the inclinations of the projector 10 with respect to the horizontal plane in the projective direction and the direction perpendicular to the projective direction within the prescribed angular range and the support member 3 including the angle regulating protrusions 33 and 34 regulating the inclinations of the projector 10 in the prescribed angular range by engaging with the angle regulating grooves 24 and 25 of the stand member 2 and coming into contact with prescribed portions of the angle regulating grooves 24 and 25 so that the angle regulating protrusions 33 and 34 of the support member 3 engage with the angle regulating grooves 24 and 25 of the stand member 2 and come into contact with the prescribed portions of the angle regulating grooves 24 and 25 when the support member 3 moves with respect to the stand member 2, whereby the inclinations of the projector 10 can be regulated within the prescribed angular range. Thus, the inclinations of the projector 10, regulable within the prescribed angular range, are not superfluously varied. Consequently, the user can easily adjust the projector 10 to a desired angle of projection.

According to the first embodiment, the projector stand 1, provided with the fixing member 4 for movably mounting the support member 3 on the stand member 2, can easily suppress dismount of the support member 3 from the stand member 2 through the fixing member 4.

According to the first embodiment, the stand member 2 is provided with the hooks 23 while the fixing member 4 is provided with the engaging hole 42 engaging with the hooks 23, whereby the support member 3 can be easily mounted on the stand member 2 by engaging the hook portions 23 into the engaging hole 42.

According to the first embodiment, the stand member 2 includes the angle regulating grooves 24 and 25 rectangular in plan view while the support member 3 includes the angle regulating protrusions 33 and 34 received in the angle regulating grooves 24 and 25 of the stand member 2 to come into contact with the inner surfaces of the angle regulating grooves 24 and 25 thereby regulating the inclinations of the projector 10 within the prescribed angular range, whereby the support member 3 is movable with respect to the stand member 2 until the angle regulating protrusions 33 and 34 come into contact with the angle regulating grooves 24 and 25. Thus, the movable range of the support member 3 with respect to the stand member 2 in the projective direction and the direction perpendicular to the projective direction can be set by setting the lengths of the angle regulating protrusions 33 and 34 and the angle regulating grooves 24 and 25 in the longitudinal direction and the short-side direction respectively.

According to the first embodiment, the stand member 2 includes the convex first locating portions 27 for horizontally locating the projector 10 while the support member 3 includes the concave second locating portions 36 for horizontally locating the projector 10 by engaging with the first locating portions 27 of the stand member 2, whereby the projector 10 can easily be horizontally located by simply engaging the second locating portions 36 of the support member 3 with the first locating portions 27 of the stand member 2. Further, the support member 3 can be horizontally arranged with respect to the stand member 2 by engaging the second locating portions 36 of the support member 3 with the first locating portions 27 of the stand member 2, whereby the plurality of screw mounting holes 35 of the support member 3 and the plurality of screw receiving holes 26 of the stand member 2 can be arranged on the positions corresponding to each other when the projector 10 is mounted on the support member 3. Thus, the projector 10 can be easily mounted on the support member 3.

According to the first embodiment, the stand member 2 includes the three screw receiving holes 26 arranged at the intervals of 120° with the prescribed radial distance from the center of the recess portion 21 and the marker 22b integrally provided on the center of the recess portion 21 for specifying the directions for providing the three screw receiving holes 26 respectively while the support member 3 includes the three screw mounting holes 35 arranged in correspondence to the three screw receiving holes 26 of the stand member 2 respectively, whereby the three screw receiving holes 26 and the three screw mounting holes 35 can be arranged on the positions corresponding to each other by arranging the three screw mounting holes 35 in the directions specified through the marker 22b respectively when the support member 3 is mounted on the stand member 2. Thus, the user can be prevented from arranging the support member 3 on the stand member 2 in a false direction. Consequently, the projector stand 1 can be prevented from impossibility of mounting the projector 10 on the support member 3 mounted with the stand member 2.

According to the first embodiment, the recess portion 21 of the stand member 2 is spherically shaped while the support member 3 is provided with the lower surface 21 having the same radius of curvature as the recess portion 21 of the stand member 2, whereby the support member 3 can be smoothly moved with respect to the stand member 2 by sliding the spherical lower surface 31 of the support member 3 with respect to the spherical recess portion 21 of the stand member 2.

According to the first embodiment, the reinforcing ribs 28 are provided on the back surface of the stand member 2 for increasing the mechanical strength of the stand member 2, whereby the weight of the stand member 2 as well as the quantity of the material for the stand member 2 can be reduced while maintaining the mechanical strength of the stand member 2.

According to the first embodiment, the reinforcing rib 37 is provided on the upper surface of the support member 3 for increasing the mechanical strength of the stand member 2, whereby the weight of the support member 3 as well as the quantity of the material for the support member 3 can be reduced while maintaining the mechanical strength of the support member 3.

According to the first embodiment, the stand member 2 is made of resin such as ABS resin so that the recess portion 21, the pair of hooks 23, the angle regulating grooves 24 and 25, the three screw receiving holes 26, the four first locating portions 27 and the reinforcing ribs 28 can be integrally formed by resin molding, whereby the number of components can be inhibited from increase.

According to the first embodiment, the support member 3 is made of resin such as ABS resin so that the lower surface 31, the long hole 32, the angle regulating protrusions 33 and 34, the three screw mounting holes 35, the four second locating portions 36 and the reinforcing rib 37 can be integrally formed by resin molding, whereby the number of components can be inhibited from increase.

Second Embodiment

Figure 12:
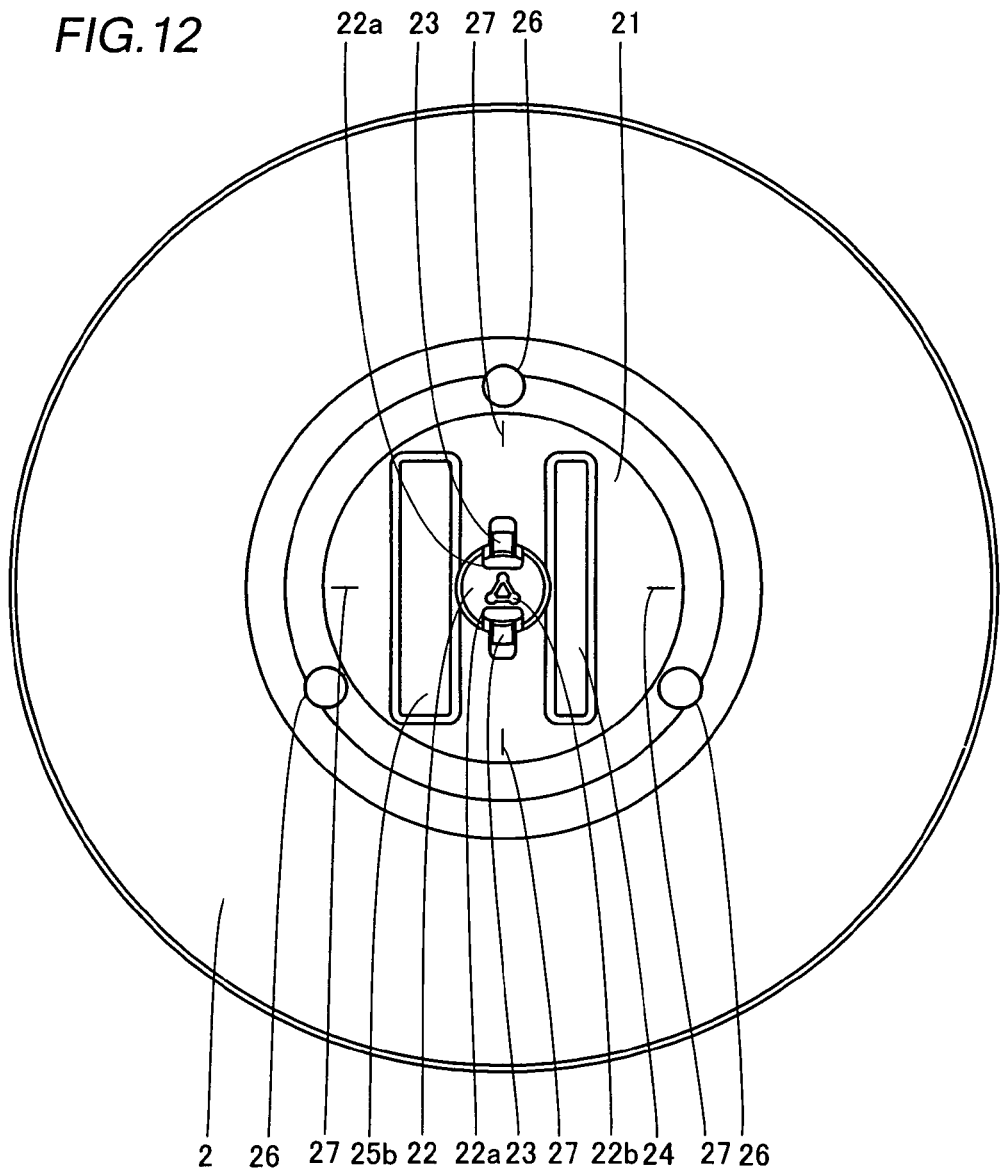
FIG. 12 is a plan view of a stand member of a projector stand according to a second embodiment of the present invention.
Figure 13:
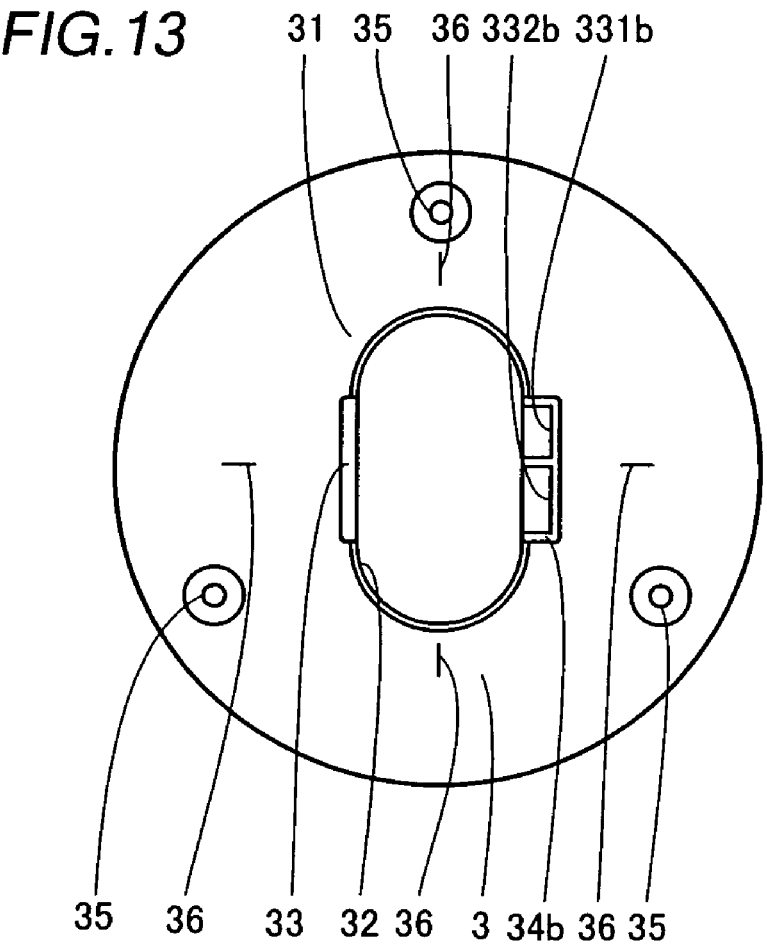
FIG. 13 is a plan view of a support member of the projector stand according to the second embodiment of the present invention.

FIG. 12 is a plan view of a stand member 2 of a projector stand according to a second embodiment of the present invention. FIG. 13 is a plan view of a support member 3 of the projector stand according to the second embodiment of the present invention. Referring to FIGS. 12 and 13, the length of a first angle regulating protrusion 34b along the short-side direction in plan view is rendered larger than the length of a second angle regulating protrusion along the short-side direction in plan view while the length of a first angle regulating groove 25b along the short-side direction in plan view is rendered larger than the length of a second angle regulating groove 24 along the short-side direction in plan view in the projector stand according to the second embodiment, dissimilarly to the aforementioned first embodiment. The structure of the second embodiment is similar to that of the aforementioned first embodiment, except the first angle regulating protrusion 34b and the first angle regulating groove 25b.

The stand member 2 of the projector stand according to the second embodiment includes the first angle regulating groove 25b, as shown in FIG. 12. The support member 3 includes the first angle regulating protrusion 34b, as shown in FIG. 13. Two notches 331b and 332b are provided on the inner side surface of the first angle regulating protrusion 34b along the short-side direction. The length of the first angle regulating protrusion 34b along the short-side direction in plan view is rendered larger than the length of the second angle regulating groove 24 along the short-side direction in plan view and smaller than the length of the first angle regulating groove 25*b* along the short-side direction in plan view. Thus, the first angle regulating protrusion 34*b* is receivable in the first angle regulating groove 25*b*, and unreceivable in the second angle regulating groove 24.

According to the second embodiment, as hereinabove described, the length of the first angle regulating protrusion 34*b* along the short-side direction in plan view is rendered larger than the length of the second angle regulating groove 24 along the short-side direction in plan view and smaller than the length of the first angle regulating groove 25*b* along the short-side direction in plan view, so that the first angle regulating protrusion 34*b* is receivable in the first angle regulating groove 25*b*, and unreceivable in the second angle regulating groove 24. Thus, the first angle regulating protrusion 34*b*, unreceivable in the second angle regulating groove 24, is received in the first angle regulating groove 25*b* when the support member 3 is mounted on the stand member 2. Consequently, the direction for mounting the support member 3 on the stand member 2 is so uniquely set that the user of the projector stand can be prevented from mounting the support member 3 in a false direction. When the support member 3 is mounted on the stand member 2, therefore, screw receiving holes 26 of the stand member 2 are necessarily arranged on positions corresponding to screw mounting holes 35 of the support member 3 respectively, whereby the projector stand can be prevented from impossibility of mounting a projector 10 on the support member 3 mounted with the stand member 2.

Third Embodiment

Figure 14:
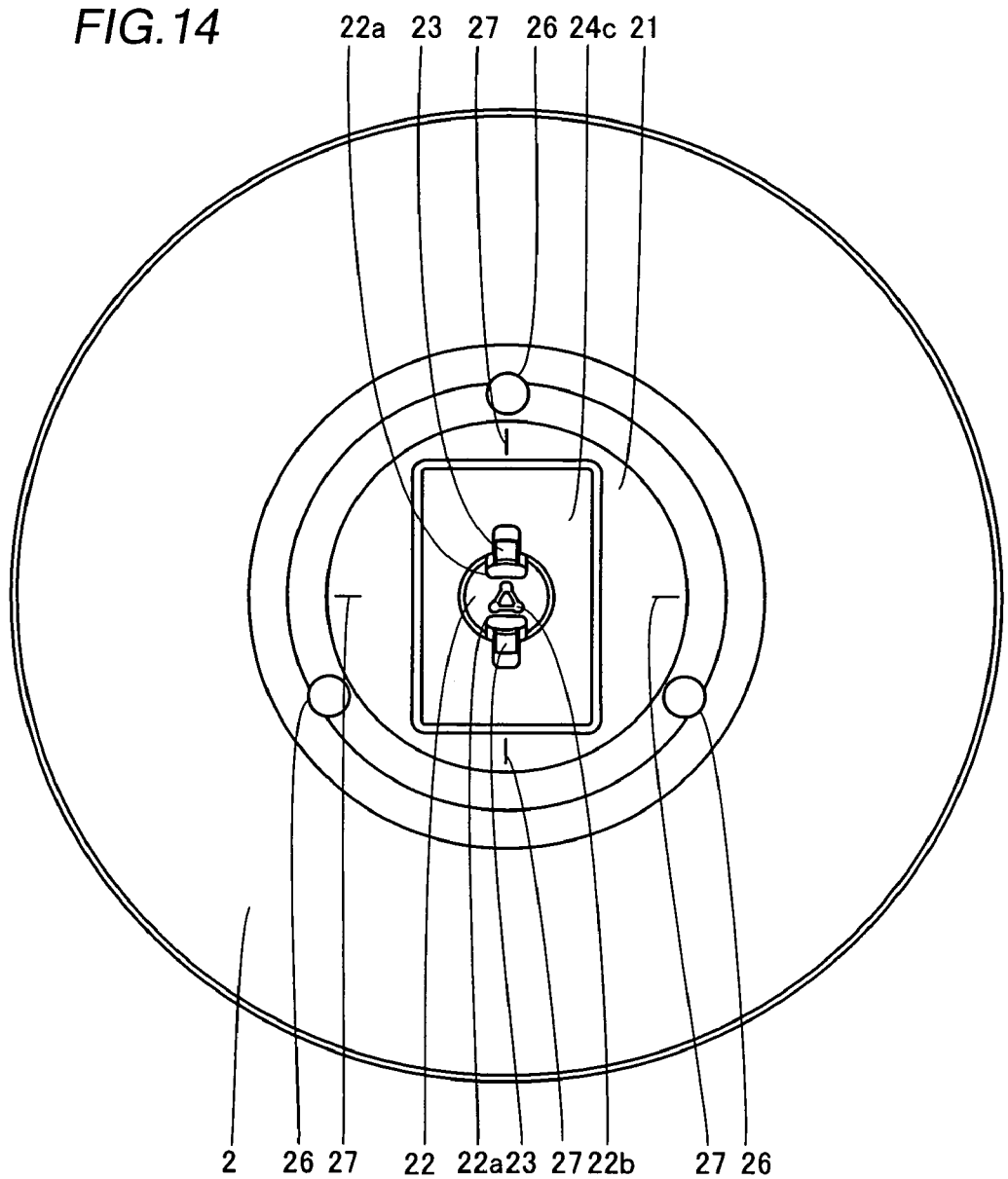
FIG. 14 is a plan view of a stand member of a projector stand according to a third embodiment of the present invention.

FIG. 14 is a plan view of a stand member 2 of a projector stand according to a third embodiment of the present invention. Referring to FIG. 14, the stand member 2 is provided with only a single angle regulating groove 24*c* in the projector stand according to the third embodiment, dissimilarly to the aforementioned first embodiment. The structure of the third embodiment is similar to that of the aforementioned first embodiment, except the angle regulating groove 24*c* of the stand member 2.

The stand member 2 of the projector stand according to the third embodiment includes the angle regulating groove 24*c* capable of receiving two angle regulating protrusions 33 and 34 (see FIG. 7), as shown in FIG. 14. A cylindrical portion 22 and a pair of hooks 23 are integrally formed on the bottom surface of the angle regulating groove 24*c*, to upwardly protrude from the bottom surface of the angle regulating groove 24*c*.

According to the third embodiment, as hereinabove described, the stand member 2 is provided with the single angle regulating groove 24*c* while the cylindrical portion 22 and the pair of hooks 23 are integrally formed on the bottom surface of the angle regulating groove 24*c* to upwardly protrude from the bottom surface of the angle regulating groove 24*c*, whereby effects similar to those of the first embodiment can be attained.

Although the present invention has been described and illustrated in detail, it is clearly understood that the same is by way of illustration and example only and is not to be taken by way of limitation, the spirit and scope of the present invention being limited only by the terms of the appended claims.

For example, while the stand member is provided with the angle regulating groove(s) and the support member is provided with the angle regulating protrusions in each of the aforementioned embodiments, the present invention is not restricted to this but the stand member and the support member may simply be so formed that the movable range of the support member with respect to the stand member can be regulated. For example, the stand member may alternatively be provided with angle regulating protrusions, and the support member may alternatively be provided with angle regulating groove(s).

While the stand member is provided with the four convex first locating portions and the support member is provided with the four concave second locating portions in each of the aforementioned embodiments, the present invention is not restricted to this but the support member may simply be rendered horizontally locatable with respect to the stand member. For example, the stand member and the support member may alternatively be provided with three first locating portions and three second locating portions or five first locating portions and five second locating portions respectively.

While the stand member is provided with the three screw receiving holes and the support member is provided with the three screw mounting holes so that the projector can be easily mounted on/dismounted from the projector stand in each of the aforementioned embodiments, the present invention is not restricted to this but the numbers of the screw mounting holes of the support member and the corresponding screw receiving holes of the stand member can arbitrarily be selected so far as the projector can be easily mounted on/dismounted from the projector stand.

What is claimed is:

1. A projector stand comprising:
   a stand member including a recess portion and a first angle regulating portion integrally provided in said recess portion for regulating inclinations of a projector with respect to a horizontal plane in a projective direction and a direction perpendicular to said projective direction within a prescribed angular range; and
   a support member integrally provided with a second angle regulating portion for regulating said inclinations of said projector within said prescribed angular range by engaging with said first angle regulating portion of said stand member and coming into contact with a prescribed portion of said first angle regulating portion and movably arranged in a state supported in said recess portion of said stand member for supporting said projector to be inclinable at prescribed angles with respect to said horizontal plane in at least said projective direction and said direction perpendicular to said projective direction.

2. The projector stand according to claim 1, further comprising a fixing member for movably mounting said support member on said stand member.

3. The projector stand according to claim 2, wherein
   said stand member includes a hook, and
   said fixing member includes an engaging hole engaging with said hook of said stand member.

4. The projector stand according to claim 1, wherein
   said first angle regulating portion of said stand member includes an angle regulating groove rectangular in plan view, and
   said second angle regulating portion of said support member includes an angle regulating protrusion inserted into said angle regulating groove of said stand member for regulating said inclinations of said projector within said prescribed angular range by coming into contact with the inner surface of said angle regulating groove.

5. The projector stand according to claim 4, wherein
   said angle regulating groove of said stand member includes a first angle regulating groove and a second angle regulating groove, said angle regulating protrusion of said support member includes a first angle regulating protrusion and a second angle regulating protrusion corresponding to said first angle regulating groove and said second angle regulating groove respectively, and the length of said first angle regulating protrusion along the short-side direction in plan view is rendered smaller than the length of said first angle regulating groove along the short-side direction in plan view and larger than the length of said second angle regulating groove along the short-side direction in plan view.

6. The projector stand according to claim 1, wherein said stand member includes an either concave or convex first locating portion for horizontally locating said projector, and said support member includes an either convex or concave second locating portion for horizontally locating said projector by engaging with said first locating portion of said stand member.

7. The projector stand according to claim 1, wherein said stand member includes a plurality of screw receiving holes provided at a prescribed angular interval with a prescribed radial distance from the center of said recess portion and a marker integrally provided on the center of said recess portion for specifying the direction for providing said plurality of screw receiving holes, and said support member includes a plurality of screw mounting holes arranged in correspondence to said plurality of screw receiving holes of said stand member respectively.

8. The projector stand according to claim 1, wherein said recess portion of said stand member is spherically shaped, and said support member includes a lower surface having the same radius of curvature as said recess portion of said stand member.

9. The projector stand according to claim 1, wherein a reinforcing rib for increasing the mechanical strength of said stand member is provided on a surface of said stand member opposite to the surface formed with said recess portion.

10. The projector stand according to claim 1, wherein a reinforcing rib for increasing the mechanical strength of said support member is provided on the upper surface of said support member.

11. The projector stand according to claim 1, wherein said stand member is made of resin.

12. The projector stand according to claim 1, wherein said support member is made of resin.

13. A projector stand comprising:

a stand member having a recess portion; and a support member movably arranged in a state supported in said recess portion of said stand member for supporting a projector to be inclinable at prescribed angles with respect to a horizontal plane in at least a projective direction and a direction perpendicular to said projective direction, wherein said stand member includes:

a first angle regulating portion integrally provided in said recess portion for regulating inclinations of said projector with respect to said horizontal plane in said projective direction and said direction perpendicular to said projective direction within a prescribed angular range, an either concave or convex first locating portion for horizontally locating said projector, a plurality of screw receiving holes provided at a prescribed angular interval with a prescribed radial distance from the center of said recess portion, and a marker integrally provided on the center of said recess portion for specifying the directions for providing said plurality of screw receiving holes, said support member is integrally provided with a second angle regulating portion for regulating said inclinations of said projector within said prescribed angular range by engaging with said first angle regulating portion of said stand member and coming into contact with a prescribed portion of said first angle regulating portion, and said support member includes:

an either convex or concave second locating portion for horizontally locating said projector by engaging with said first locating portion of said stand member, and a plurality of screw mounting holes arranged in correspondence to said plurality of screw receiving holes of said stand member respectively, said first angle regulating portion of said stand member includes an angle regulating groove rectangular in plan view, and said second angle regulating portion of said support member includes an angle regulating protrusion entering said angle regulating groove of said stand member.

14. The projector stand according to claim 13, further comprising a fixing member for movably mounting said support member on said stand member.

15. The projector stand according to claim 14, wherein said stand member includes a hook, and said fixing member includes an engaging hole engaging with said hook of said stand member.

16. The projector stand according to claim 13, wherein said recess portion of said stand member is spherically shaped, and said support member includes a lower surface having the same radius of curvature as said recess portion of said stand member.

17. The projector stand according to claim 13, wherein a reinforcing rib for increasing the mechanical strength of said stand member is provided on a surface of said stand member opposite to the surface formed with said recess portion.

18. The projector stand according to claim 13, wherein a reinforcing rib for increasing the mechanical strength of said support member is provided on the upper surface of said support member.

19. The projector stand according to claim 13, wherein said stand member is made of resin.

20. The projector stand according to claim 13, wherein said support member is made of resin.

* * * * *